United States Patent Office 3,054,198
Patented Sept. 18, 1962

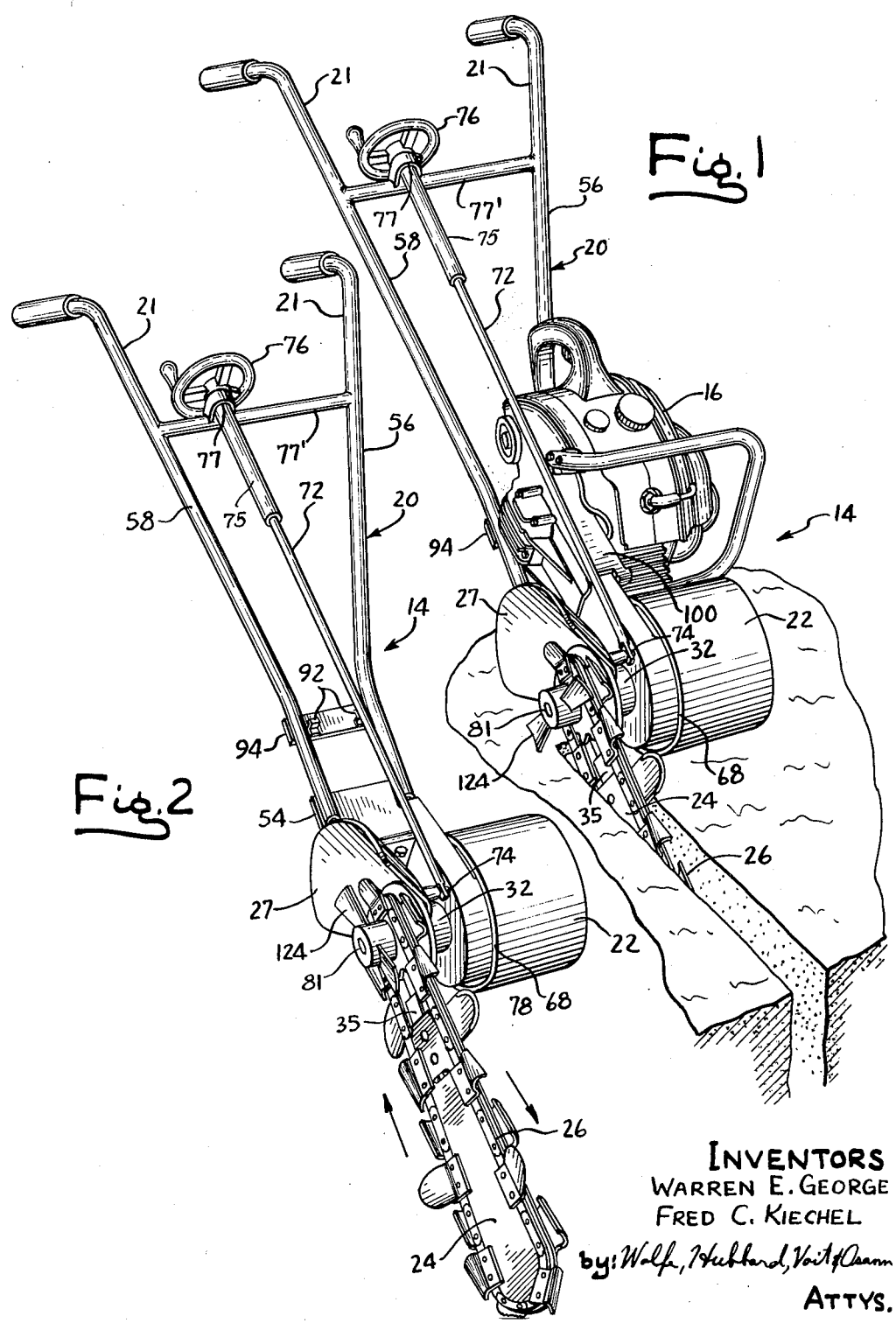
Sept. 18, 1962    W. E. GEORGE ET AL    3,054,198
MOBILE TRENCHING TOOL
Filed June 24, 1959    3 Sheets-Sheet 1
INVENTORS
WARREN E. GEORGE
FRED C. KIECHEL
ATTYS.

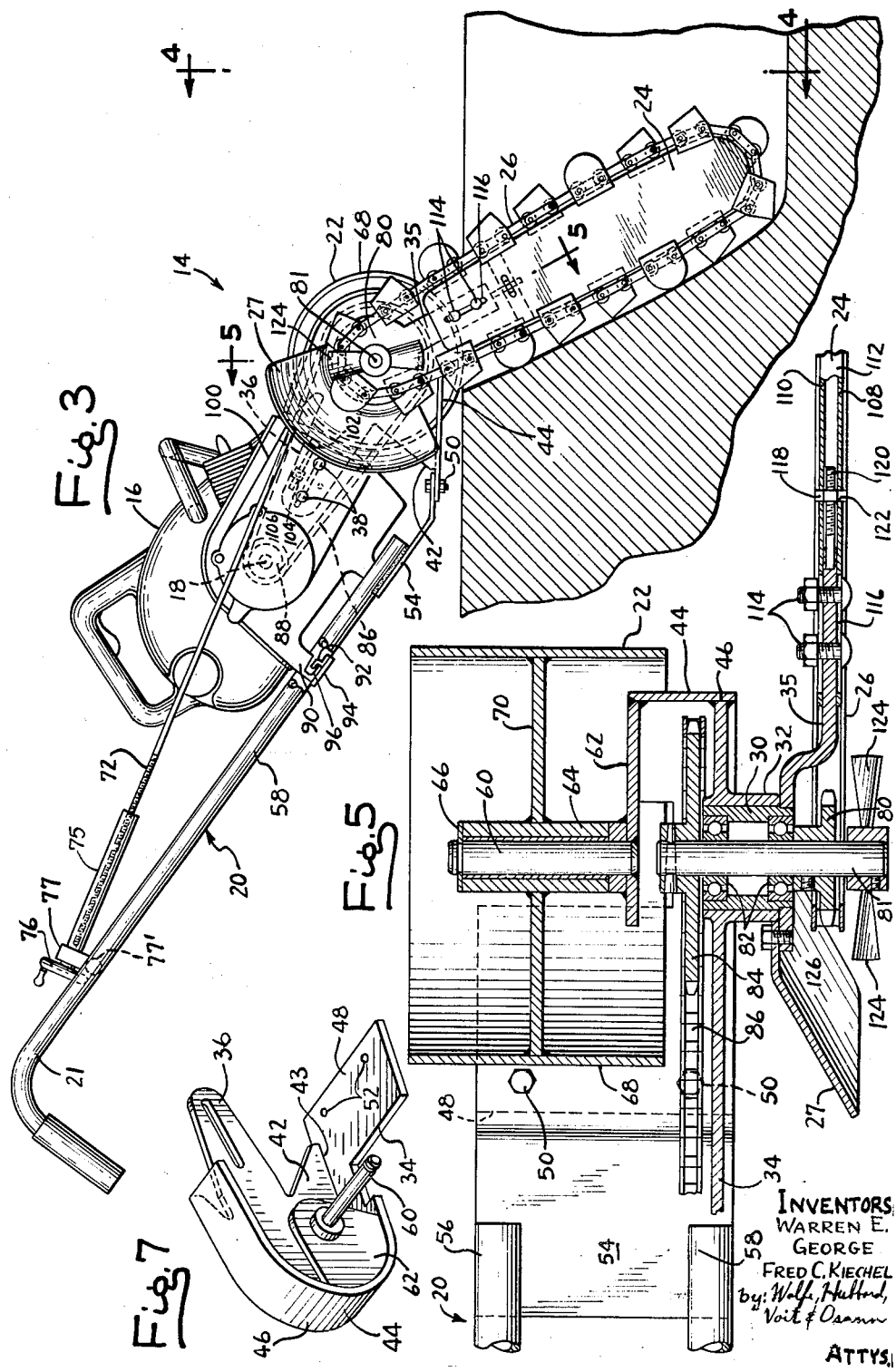

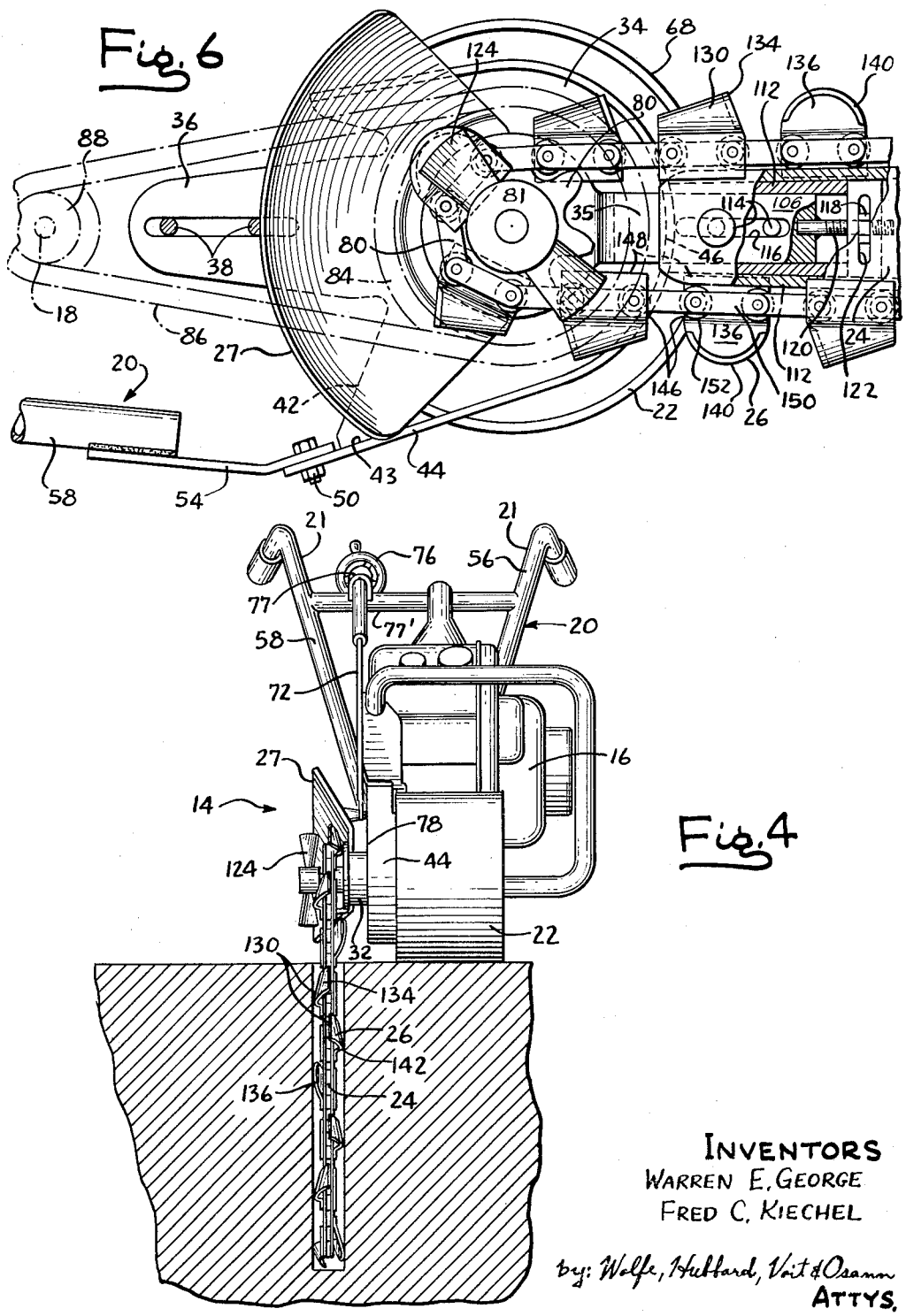

3,054,198
MOBILE TRENCHING TOOL
Warren E. George and Fred C. Kiechel, Auburn, Nebr., assignors to Auburn Machine Works, Inc., Auburn, Nebr., a corporation of Nebraska
Filed June 24, 1959, Ser. No. 822,461
8 Claims. (Cl. 37—86)

This invention relates to a trenching tool and more particularly to a mobile trenching tool having a digger chain adapted to be driven by a portable power unit.

It is a general object of the invention to provide a mobile trenching tool having a power driven digger chain for cutting a narrow kerf of substantial depth in the earth, such as might be required for laying service piping or cable. Another general object is to provide a mobile trenching tool that may readily be handled by one man and by means of which a neat, uniform, kerf or trench may rapidly be dug in earth, the tool having sufficient effective power to cut or work through obstructions such as small stones or tree roots as may be encountered in cutting the kerf.

Another object of the invention is to provide a trenching tool in the form of an attachment for a portable power unit such as a conventional high-speed two-cycle chain saw engine. A related object is to provide a separate attachment in the form of a mobile unit on which the power source, such as a portable chain saw engine, may be mounted, and which provides a digger chain adapted to be driven from the chain saw engine. A further object is to provide an attachment which incorporates a step-down drive so that the digger chain is driven at the proper speed for cutting in earth.

Still a further object is to provide a simple, easily handled, and relatively inexpensive mobile trenching tool for digging or sawing a small trench in the earth, such as might be needed for installing electrical cable or gas line to a building, or for placing a line or cable across a lawn to residential yard light, or for installing piping or plastic hose in an existing lawn for a sprinkler system. It is another object to provide a trencher which is particularly suited for such use, and provides a neat kerf with sharply defined edges so narrow in width that after being filled it may be closed by pressing the edges of the grass together over the kerf, so that the cut becomes practically invisible.

Another object is to provide a trenching tool having a pivotal boom supporting a digger chain, and which is adjustable angularly to an inclined digging position so as to obtain a desired depth of cut. A further object is to provide a trenching tool in which the boom is adjustable while the digger chain is operating so that the boom may plunge cut into the ground to the desired cutting depth.

A further object is to provide a trenching tool having a ground engaging member for moving the tool easily along the surface by hand and which serves as a reaction member so that the boom remains stable and does not buck or bounce while the chain is operating.

Another object is to provide a trenching tool having a trenching boom carried offset from the axis of the tool and adjacent one side so that a kerf may be cut right up to the edge of a structure or obstruction.

Another object is to provide a trenching tool having easily operated adjustments for setting the proper tension in the digger chain.

Another object is to provide a tool having means for deflecting dirt and stones from being thrown toward the operator so that the trenching tool is made safer to operate.

Another object is to provide a trenching tool having a digger chain supporting boom which has a novel hollow construction in order to reduce the over-all weight of the tool yet providing a thick boom which is capable not only of more effective cutting, but also assists in maintaining the kerf clear of dirt and debris after the cut is made.

Other objects and advantages will become apparent as the following description proceeds, taken in connection with the accompanying drawings, wherein:

FIGURE 1 is a perspective view of a trenching tool including an attachment driven by a portable power unit such as a chain saw engine;

FIG. 2 is a perspective view illustrating the trenching attachment separated from the power unit;

FIG. 3 is a view in side elevation of the trenching tool with the boom in digging position;

FIG. 4 is a view in front elevation of the trenching tool shown in FIG. 3, and is taken in the offset planes of lines 4—4 of FIG. 3;

FIG. 5 is an enlarged sectional view taken in the offset planes of lines 5—5 of FIG. 3;

FIG. 6 is an enlarged fragmentary view illustrating the support for the trenching boom; and FIG. 7 is a perspective view of the trencher boom assembly mounting plate.

While the invention is susceptible of various modifications and alternative constructions, an illustrative form has been shown in the drawings and will be described below in detail. It is to be understood, however, that there is no intention to limit the invention to the specific form disclosed but, on the contrary, the invention covers all modifications, alternative constructions and equivalents falling within the spirit and scope thereof as expressed in the appended claims.

As a preferred embodiment of the invention, it has been shown in a trenching tool 14 in the form of an attachment for a power unit 16 such as a conventional chain saw engine having a power output shaft 18. In FIG. 2, the attachment is shown separately from the chain saw engine and from this figure it will be seen that according to the present invention, the basic units of the attachment include a V-frame structure 20 having a pair of spaced handle bars 21 by means of which the attachment may be guided by one man, a ground engaging member substantially in alignment with the apex of the V supporting the frame for movement along the ground, in the present instance comprising a wheel 22, and a trencher boom assembly mounted on the lower end of the frame having an elongated trencher boom 24 around which an endless digger chain 26 is trained. The boom is mounted laterally adjacent the wheel 22 offset from and parallel to the axis of the frame and is carried for pivotal movement from a raised position to a downwardly inclined cutting position. As viewed in FIG. 3, the endless chain 26 is driven for digging in a clockwise direction so that it digs while moving upwardly along the end of the kerf, throwing dirt and debris upwardly toward a deflection plate 27 which is curved to deposit the material laterally of the kerf making it safe to operate the attachment because of the interposed deflection plate which is effective to prevent the material which is being thrown at high speed from reaching the operator. In the present instance, the attachment is pulled by the operator who grips the handle bars to draw the trenching tool along the ground (to the left in FIG. 3).

In keeping with the invention, the wheel 22 which carries the frame along the ground is journaled for rotation about an axis transverse to that of the frame. The trencher boom assembly is also carried at the lower end of the frame laterally of the wheel 22, means being provided for mounting the trencher boom for pivotal movement about the axis of rotation of the wheel 22 so that the angular position of the boom may be adjusted for cutting to different depths. In the present case, the trencher boom is supported by means of a sleeve 30 rotatably received within a stationary collar 32 secured to the attachment frame and also to the housing of the chain saw engine mounted on the frame by means of a mounting plate 34 (FIG. 7). To achieve this end the sleeve 30 is rigidly fastened to one end of a stub bar 35 which carries the trencher boom. The collar 32 is rigidly attached to the mounting plate 34 which is shown in perspective in FIG. 7, a view, however, looking at the opposite side of the plate so that the collar 32 is not visible. The mounting plate 34 has an elongated arm 36 adapted to be fastened to the housing of the chain saw engine by means of the mounting bolts 38 which are provided to secure the chain saw guide bar to the housing. A slot is provided to receive the mounting bolts 38. In addition to the elongated arm 36, the mounting plate has a downwardly extending leg 42 which is adapted to be connected at its lower edge 43 to a curved bar 44 that extends completely around the curved forward end 46 of the mounting plate to form an enclosure and shield for certain parts of the digger chain drive mechanism. The curved bar 44 has a wide section 48 at its lower end and is adapted to be secured by bolts 50 extending through mounting holes 52 to a bar 54 bridging the ends of the tubular members 56, 58 which comprise the frame.

In order to carry the lower end of the frame 22 and the drive mechanism for the trencher boom assembly for movement along the ground on the wheel 22, the latter is supported by means of a stub shaft 60 (FIG. 7) fixed to the mounting plate 34 by means of a flat triangular bracket 62. The hub 64 of the wheel 22 is journaled on the stub shaft 60 and held against endwise movement by a washer 66. In the present instance, the wheel 22 includes a cylindrical metal rim 68 and a transverse web 70 carried intermediate the ends of the hub.

For adjusting the angular position of the trencher boom, an adjusting mechanism is provided including a shaft 72 fixed at its lower end to the shield 27 as by a pin 74. The shaft 72 is threaded on the upper end and received within a shaft-like member 75 connected so as to be rotated by a hand wheel 76. The shaft-like member 75 is supported on the attachment frame 20 within a bracket 77 carried on the cross-brace 77'. Rotation of the hand wheel 76 extends or withdraws the shaft 72 to adjust the sleeve 30, stub bar 35, and trencher boom 24 angularly about the axis of the sleeve 30 and within the stationary collar 32. Thus, by turning the hand wheel, the position of the trencher boom is adjusted. In the present instance the trencher boom is adjustable between a horizontal position and an inclined cutting position, the depth of cut being determined by the angle of the boom, the maximum cut being taken with the trencher boom arranged substantially vertical. By appropriate adjustment, the depth of cut may be varied from a few inches to the full reach of the trenching boom. It will also be readily evident that the boom may be adjusted while the digger chain is operating so as to plunge the trencher boom into the earth by turning the hand wheel until the desired depth of cut is achieved. The latter effect is made possible by the direction of movement of the chain, tending to dig deeper in the earth and by using a form of chain which tends to pull itself into the earth, which will be described more in detail hereinafter, so as to reduce the effort required on the part of the operator either to lower the trencher boom to cutting position or to draw the attachment along the ground once the proper cutting depth is reached.

For operating the digger chain 26, a sprocket 80 is mounted on an intermediate power shaft 81 journaled on the mounting plate 34. In the present case, the stub bar 35 which serves to carry the trencher boom 24 is offset at its upper end to receive the sprocket 80 on intermediate power shaft 81 so that the sprocket is aligned with the boom. The sleeve 30 to which the end of the stub bar 35 is rigidly fastened, is provided with spaced ball bearings 82 in which the intermediate power shaft is carried. The endless digger chain is trained around the trencher boom 24 and the drive sprocket 80.

To drive the sprocket 80 by means of the intermediate power shaft 81, the opposite end of the latter carries a roller chain sprocket 84 coupled by means of a roller chain 86 to a sprocket 88 on the output shaft 18 of the power unit 16. It is a feature of the invention that the speed of the output shaft 18 of the power unit is reduced by a step-down drive including the sprocket on the output shaft of the engine and the driven sprocket. For example to secure a digger chain speed of approximately 150'/minute, a speed reduction of 1:3 (as depicted), may be required in the drive mechanism to reduce the speed of the output shaft of a high-speed chain saw engine to an r.p.m. slow enough to produce such a linear chain speed. Excessive speed has disadvantages in the operation of a trenching attachment and may make the operation unsafe due to the increased danger to the operator. A different speed ratio in the drive mechanism may be achieved by a change in one or both sprockets.

It has been found advantageous to mount the stub bar 35 and trencher boom 24 for pivotal movement by means of the rotatably adjustable sleeve 30, about an axis arranged coaxially of the axis of rotation of the wheel 22. Since the bracket 62 for mounting the wheel is rigidly attached to this sleeve, with the present arrangement adjustment of the sleeve does not change the relative position of the axis of rotation of the wheel. Therefore, neither the vertical nor the horizontal position of the sleeve is changed with respect to the mounting plate 34 by adjustment of the angular position of the trencher boom assembly. Also, the alignments of the elements of the drive for the digger chain remain the same in all positions of adjustment of the trencher boom assembly, since the pivotal axis of the latter is unchanged. Therefore, the chain saw engine output shaft sprocket 88 and the sprocket 84 on the intermediate power shaft 81, remain in the same relative positions, as similarly do the digger chain sprocket 80 and the trencher boom 24, regardless of the angular position of the boom.

In the present instance, the trenching attachment is particularly suited to receiving power from a portable power unit, such as a chain saw engine 16 mounted on the frame 20 of the attachment. Thus the invention has particular utility when constructed as an auxiliary attachment for a conventional chain saw engine, and provides an appropriate drive mechanism to achieve the linear speed of the digger chain required for effective trenching with the throttle of the engine set at a running position. It will be understood the throttle may be set by a lock mechanism or some similar means with which the chain saw engine 16 is equipped.

In order to facilitate mounting the engine on the attachment frame 20 with ease and speed, in the present case there is utilized the provision on the housing of the chain saw engine 16 of feet 90 which are clipped to the attachment frame. This is achieved by means of clips 92 fastened on a transverse plate 94 bridging the tubular side members 56, 58 of the frame. The said clips are positioned to be engaged by flanges 96 on the feet of the chain saw housing. The engine is thus rigidly fastened on the attachment frame 20 simply by sliding the housing into place so that the feet of the housing are properly held, and then bolting the mounting plate 34 to the chain saw housing, at a point adjacent the output shaft, by means of the usual mounting bolts 38. With this arrangement the chain saw engine may quickly be removed from or installed on the attachment frame. The attachment frame provides a sturdy and stable platform for support of the engine, having a cross brace 77' near the handle bars, and the wide bar 54 bridging the lower end of the tubular members 56, 58.

In the present instance, as above stated, the mounting plate 34 is secured to the housing of the chain saw engine by means of the mounting bolts 38 ordinarily used for securing the conventional guide bar on the housing. A standard sprocket cover 100 is mounted on the chain saw housing. To adjust the tension of the roller chain 86, in the present case, provision is made to utilize the standard means found in the sprocket cover for adjusting chain tension, including an adjusting screw 102 for shifting the axial position of the elongated arm 36 of the mounting plate 34 by means of a block 104 movable lengthwise of the sprocket and having a laterally extending pin 106 adapted to be received in a hole in the arm.

A somewhat similar arrangement is provided for adjusting the tension of the digger chain 26 on the trencher boom 24. In this case the stub bar 35 has a narrow rectangular end 106 which fits between the side walls of the boom. The boom is, in the present embodiment, made hollow in order to reduce the overall weight of the attachment and may be made as a laminated bar having a pair of outer laminations 108, 110 and a hollow core entirely within a narrow, elongated U-shaped strip 112 joined between the edges of the outer laminations 108, 110. To constrain the boom to lengthwise movement, a pair of bolts 114 may be employed received in aligned slots 116 in the outer laminations 108, 110 of the boom. The digger chain tension is adjusted according to the present arrangement, by means of a manually adjusted nut 118 in which a threaded shaft 120, fixed to the stub bar 35, is received. The nut 118 is held in a cross slot 122 extending through both outer laminations 108, 110, while the shaft 120 is confined between the laminations.

It was described above how the deflector plate 27 is effective to shift the dirt and debris thrown up by the digger chain laterally to one side so as to prevent injury to the operator. The deflector plate 27 may be mounted in any suitable way, as by being fixed at its inner edge to the sleeve 30 which is carried on the end of the stub bar. While the shape of the deflector plate 27 may be varied, it has been found that in general its shape should be curved to deflect the dirt and debris sidewise, and the surface of the plate should be in line with the digger chain. As a further means for deflecting the dirt and debris laterally, a partial flight 124 in the form of a pair of opposed curved blades may be carried on the end of the intermediate power shaft 81. The flight should, preferably, be in line or substantially in line as shown, with the digger chain, and operating with the chain will tend to break up the earth into fine dust-like particles and move it laterally to one side of the kerf so that the dug-out earth does not fall back into the kerf. It has been found that with the flight 124 the earth is distributed in a wide path adjacent the kerf such that much of it can be scraped back in, to fill the kerf, if desired.

The dirt and debris thrown up by the chain is partly deflected from the conventional sprocket 80 used to operate the digger chain, by the deflector plate 27, which may be assisted, as indicated above, by the flight 124 carried on and rotated with the sprocket shaft 81. In the present case, the hub of the sprocket 80 prevents the entrance of dirt and dust into the bearings 82 received within the sleeve 30, and a cover plate (not shown) may also be included. The curved bar 44 which extends completely around the front edge of the mounting plate 34 serves as a shield to protect from dirt getting into the roller chain drive mechanism and the power unit is covered and shrouded adequately so that it may operate under the conditions imposed.

In order to provide a trenching attachment which may be operated manually, without supplying power to the wheel 22 to move the attachment along the surface of the ground, a digger chain 26 is employed which has a tendency to pull itself into the earth as it operates. This tendency is enhanced by employing curved cutting bits 130 having free toe portions 134, as shown in FIG. 4, inclined over the center line of the chain. A preferred form of digger chain is shown mounted on the attachment, comprising in the present case, sets of left and right-hand curved bits 130 longitudinally spaced along the chain by coulter bits 136. The coulter bits 136 comprise vertical side cutting bits which may have some form, having sharpened top edges 140, which latter edges are effective in the operation of the chain to define the margin of the kerf. To achieve this end the coulter bits 136 are arranged serially left and right hand along the chain. Thus, as shown in FIGS. 2, 3 and 4, sets A of left and right-hand curved bits 130 are separated by individual left or right-hand coulter bits B, C, respectively. It is preferred that the coulter bits be inclined outwardly so that the sharpened top edges 140 lie at the side extremities of the chain, outwardly of the trencher boom and in substantial vertical alignment with the outermost edges of the shanks 142 of the curved bits 130. The tendency of the chain to pull itself into the earth is produced by the inclined toe portion 134 of the curved bits which angle over the chain toward its center line. The forward cutting edge of the shank and toe of each curved bit 130 is sharpened, as is the top edge of each of the coulter bits 136.

While different chain constructions may be used, in the present case the bits (both types) are carried by side links 146 of the chain. The bit-carrying side links 146 have a depending section 148 which travels along the side of the boom 24, while the opposite side links 150 are of conventional, narrow, rectangular form. The side links 146 carrying the bits thus straddle the trencher boom. In the present case the chain, in addition to the side links, includes rollers 152 on the pins or rivets employed for securing the links together.

The trencher boom is relatively thick, as mentioned above, so that it displaces substantially greater than half the total width of the kerf. With such an arrangement, the kerf is kept cleaner of dirt and debris after being formed. In the travel of the chain through the earth in the trenching operation, the particles formed in cutting do tend to filter down on top of the trencher boom and between the elements of the chain which carry the dirt and debris particles out of the kerf.

These dirt and debris particles formed by the chain are carried out of the kerf also by the same teeth that do the cutting, the chain in the present case having relatively high teeth spaced a large distance above the chain so that it has a greater capacity for cutting without binding by maintaining the cutting edges free for forming the sides and bottom of the kerf.

The tendency of the curved cutting bits to pull deeper into the earth is limited by the resistance offered by the earth to penetration of the cutting edges on all cutting edges in the chain. A good balance between the tendency to pull into the earth, and the resistance offered thereby, provides a self-feeding chain which operates with a minimum of stalling in the kerf. A self-feeding chain requires a minimum of force by the operator to draw the attachment along the ground and, in addition, permits plunging the trencher boom into the earth to start the trenching operation.

The force due to the tendency of the digger chain to draw the trencher boom into the earth reacts against the ground engaging wheel 22, and this effect has been utilized to achieve more stable operation with less bucking and bouncing of the trencher boom. Lowering the trencher boom to cutting position, therefore, does not require substantial force on the part of the operator and by moving the hand wheel the trencher boom is guided to the proper cutting depth. To pull the trencher through the earth thereby forming a trench or kerf, requires some force to be exerted, however the attachment frame which provides spaced handle bars at the upper end, which may be equipped with rubber hand grips, may be set at a comfortable operating height suited for the particular operator. Accordingly, it is an important practical feature of the invention that the level of the handle bars may be raised or lowered as desired so that persons of different height may find the most comfortable operating position, since the angle of the trencher boom is adjustable and may be set with respect to the handle bars regardless whether they are set high or low for a tall or short man to manage.

Another important feature of the invention resides in the location of the trencher boom 24 offset from the axis of the attachment frame 20 and at the side of the unit so that a trench may be cut right up to a structure such as a wall. It has been found that the operator of the attachment is able to control the movement along the ground with considerable precision, obtaining a uniform, straight, neat kerf. Similarly, the trenching attachment may be guided close to an existing structure or obstruction on the surface or embedded in the ground. It has also been found to be an advantage that by rocking back on the handle bars the trencher boom assembly is moved so that the chain is instantly disengaged from cutting relation to separate it from an obstruction such as a stone or heavy root. Similarly, the trenching attachment may be fed gradually along the trench by manipulating the handle bars so that the chain is moved or raised to clear an obstruction in the bottom of the kerf to provide better cutting should the load on the chain due to the kind or character of the soil or obstructions in it, tend to stall the chain in the kerf. Thus a versatile, fast cutting, one-man trenching attachment has been provided.

While the invention has been described as having particular utility when made as an attachment to be used with a separate portable power unit, it will readily be understood that the term attachment as used herein and in the claims is intended to cover a unitary structure that may be manufactured and sold as a complete tool with its own power unit permanently attached.

We claim as our invention:

1. In combination with a portable power unit having a motor and a power output shaft, an earth trenching attachment comprising a frame including a pair of spaced handle bars at the upper part of the frame, a wheel journaled on the lower part of said frame for rotation about an axis transverse to the axis of said frame and adapted to support the latter with the wheel in rolling contact with the earth, means fixing said power unit on said frame at a point above said wheel, an elongated trenching boom carried by said frame in spaced relationship with said power unit, means for mounting said boom for pivotal movement relative to said frame and the power unit fixed thereon about the axis of rotation of the wheel from a raised horizontal position to a lowered inclined trenching position and adapted to be fixed at such trenching position, said frame being freely pivotable about the axis of said wheel to change the inclination of said boom during the trenching operation, an endless chain trained around said boom having bits for digging a narrow kerf in the earth, and means connecting said power output shaft to drive said chain.

2. In combination with a portable power unit having a motor and a power output shaft, an earth trenching attachment comprising a frame, means on the lower part of said frame for engagement with the ground and adapted to support the frame for movement along the surface of the ground, means for securing said power unit on said frame at a point above said last-named means, an elongated trenching boom carried by said frame laterally of said ground engaging means so that the latter is located solely on one side of a kerf dug with said boom, means supporting said boom for pivotal movement from a raised horizontal position to a lowered inclined trenching position, an endless chain trained around said boom having bits for digging a narrow kerf in the earth, means connecting said power output shaft to drive said chain including a sprocket for driving the chain rotatably supported on the upper end of the boom, and a deflector carried at the upper end of said boom adjacent the sprocket so as to be in line with the earth thrown upwardly by the chain during the digging operation, said deflector being curved around the sprocket to deflect the earth from the operator and angled sharply over the chain away from the ground engaging means so as to deflect the earth from the latter and deposit the same on the opposite side of the kerf.

3. In combination with a portable power unit having a motor and a power output shaft, an earth trenching attachment comprising a frame, means on the lower part of said frame adapted to support the latter for movement along the surface of the ground, means for securing said power unit on said frame at a point above said last-named means, an elongated trenching boom carried by said frame for pivotal movement from a raised horizontal position to a lowered inclined trenching position, an endless chain trained around said boom having bits for digging a narrow kerf in the earth, means connecting said power output shaft to drive said chain including a sprocket for driving the chain rotatably supported on the upper end of the boom, a deflector carried at the upper end of said boom and extending partially around the sprocket so as to be in line with the earth thrown upwardly by the chain during the digging operation, and a screw-like flight rotatable with the sprocket within the deflector and cooperating with the latter for moving the earth laterally and depositing the same adjacent one side of the kerf.

4. In combination with a power unit having a motor and a power output shaft, an earth trenching attachment comprising a frame, means on the lower part of said frame adapted to support the latter including a member mounted for movement along the surface of the ground adjacent one side of a narrow kerf produced in the digging operation, means for securing said power unit on said frame at a point above said last-named means, an elongated trenching boom pivotally carried by said frame laterally spaced from said support means so that the latter is located solely on one side of a kerf dug with said boom, means supporting said boom for pivotal movement from a raised horizontal position to a lowered inclined trenching position, means operatively connected to the frame and the boom for adjusting the position of the latter, an endless chain trained around said boom having bits for digging a narrow kerf in the earth, means connecting said power output shaft to drive said chain, and means including a deflector carried by said frame at the upper end of said boom in alignment with the chain for receiving earth thrown upwardly by said chain during the digging operation and deflecting said earth laterally in a direction away from said support means to deposit the same adjacent the opposite side of the kerf.

5. In combination with a portable power unit having a motor and a power output shaft, an earth trenching attachment comprising a frame including a pair of spaced handle bars at the upper part of the frame and a plate fixed on the lower part of said frame, a shaft supported by said plate and extending laterally to one side of said frame, a wheel journaled on said shaft for rotation about an axis transverse to the axis of said frame and adapted to support the frame with the wheel in rolling contact with the ground, means including said plate for securing said power unit on said frame at a point above said wheel, said plate being adapted to be fastened to said power unit adjacent said output shaft, a drive shaft carried by said plate in alignment with said first mentioned shaft and extending laterally to the other side of said frame, a stub bar journaled on said drive shaft for pivotal movement about an axis aligned with the axis of rotation of the wheel, an elongated trenching boom mounted on said stub bar for pivotal movement with the latter from a raised horizontal position to a lowered inclined trenching position and adapted to be fixed at such trenching position, said frame being freely pivotable about the axis of said wheel to change the inclination of said boom during the trenching operation, a roller chain sprocket fixed on said drive shaft in alignment with a sprocket on said power shaft, a roller chain coupling said output and drive shafts, a digger chain sprocket fixed on said drive shaft in alignment with said trenching boom, and an endless digger chain trained around said boom and said digger chain sprocket having bits for digging a narrow kerf in the earth.

6. In combination with a portable power unit having a motor and a power output shaft, an earth trenching attachment comprising a frame, a single wheel journaled on one end of said frame for rotation about a transverse axis and adapted to support the frame with the wheel in rolling contact with the ground adjacent one side of a narrow kerf produced in the digging operation, means for securing said power unit on said frame at a point adjacent said wheel, an elongated trenching boom, means for supporting said boom for pivotal movement about the axis of the wheel from a raised position to a lowered inclined trenching position, said last-named means being arranged to support the boom laterally adjacent the single wheel offset from and parallel to the axis of said frame, an endless chain trained around said boom having bits for digging a narrow kerf in the earth, means connecting said power output shaft to drive said chain, and means including a deflector carried by said frame in alignment with said chain for receiving earth thrown upwardly thereby during the digging operation and deflecting said earth laterally in a direction away from said wheel to deposit the same adjacent the opposite side of the kerf.

7. An earth trenching tool comprising a frame, a single wheel journaled on one end of said frame for rotation about a transverse axis and adapted to support the frame with the wheel in rolling contact with the ground, means for securing a power unit on said frame at a point adjacent said wheel, an elongated trenching boom, means for supporting said boom for pivotal movement about an axis parallel to the axis of the wheel from a raised position to a lowered inclined trenching position, said last-named means being arranged to support the boom laterally adjacent the wheel offset from and parallel to the axis of said frame, an endless chain trained around said boom having bits for digging a narrow kerf in the earth, means connecting said power unit to drive said chain, and a deflector carried by said frame in alignment with said chain for receiving earth thrown upwardly thereby during the digging operation and deflecting said earth laterally in a direction away from said wheel to deposit the same adjacent the opposite side of the kerf.

8. In combination with a portable power unit having a motor and a power output shaft, an earth trenching attachment comprising a frame, means for carrying the frame for movement along the ground including a member positioned to contact the surface of the ground adjacent one side of a narrow kerf produced in the digging operation, said frame being free from contact with the ground on the other side of the kerf, means fixing said power unit to said frame, an elongated trenching boom pivotally carried by said frame laterally spaced from said ground contacting member and in spaced relationship with said power unit, said trenching boom being pivotally movable relative to said frame and the power unit carried thereby between a raised position and a lowered inclined trenching position, a chain trained around said boom and operatively connected to be driven from the power shaft of said motor to produce a narrow kerf in the earth when said boom is lowered into trenching position, and means including a deflector carried by said frame in alignment with said chain for receiving earth thrown upwardly thereby during the digging operation and deflecting said earth laterally in a direction away from the support member to deposit the same adjacent the opposite side of the kerf.

References Cited in the file of this patent

UNITED STATES PATENTS

| | | |
|---|---|---|
| 1,858,360 | Cruse | May 17, 1932 |
| 2,310,735 | Greer | Feb. 9, 1943 |
| 2,798,314 | Brite | July 9, 1957 |
| 2,835,055 | Hermes | May 20, 1958 |
| 2,888,757 | Sheen | June 2, 1959 |
| 2,991,571 | Hyster | July 11, 1961 |